United States Patent [19]

Lauritzen et al.

[11] Patent Number: 5,435,595
[45] Date of Patent: Jul. 25, 1995

[54] PASSENGER SIDE AIRBAG MODULE HAVING LENGTHENED REACTION CANISTER

[75] Inventors: Donald R. Lauritzen, Hyrum; Donald J. Paxton, Brigham City; Larry D. Rose, Layton, all of Utah

[73] Assignee: Morton International, Inc., Chicago, Ill.

[21] Appl. No.: 181,897

[22] Filed: Jan. 14, 1994

[51] Int. Cl.6 .............................................. B60R 21/26
[52] U.S. Cl. .................................. 280/728.2; 280/736; 280/740
[58] Field of Search ........... 280/740, 736, 732, 730 R, 280/728 A, 742, 741, 728 R

[56] References Cited

U.S. PATENT DOCUMENTS

| 3,649,045 | 3/1972 | Smith et al. | 280/736 |
|---|---|---|---|
| 3,817,552 | 6/1974 | Knight, IV et al. | 280/732 |
| 3,868,125 | 2/1975 | Fisher et al. | 280/740 |
| 5,332,256 | 7/1994 | Lauritzen et al. | 280/740 |
| 5,344,182 | 9/1994 | Lauritzen et al. | 280/728 A |

FOREIGN PATENT DOCUMENTS

| 4016046 | 11/1991 | Germany | 280/736 |
|---|---|---|---|
| 4019677 | 1/1992 | Germany | 280/736 |
| 0036137 | 3/1980 | Japan | 280/732 |
| 0092451 | 4/1991 | Japan | 280/736 |
| 2022194 | 12/1979 | United Kingdom | 280/740 |

Primary Examiner—William E. Terrell
Assistant Examiner—Peter C. English
Attorney, Agent, or Firm—George W. Rauchfuss, Jr.; Gerald K. White

[57] ABSTRACT

An inflator substantially shorter than the reaction canister is employed in a passenger-side airbag module. In order to properly distribute the inflating gas, a diffuser is employed which forms a plenum chamber having gas discharge openings in preselected locations relative to the mouth of the airbag.

10 Claims, 3 Drawing Sheets

PASSENGER SIDE AIRBAG MODULE HAVING LENGTHENED REACTION CANISTER

TECHNICAL FIELD

This invention relates to airbag modules for motor vehicles. More particularly, it relates to such modules which are adaptable to vehicle space restraints.

BACKGROUND ART

Two types of airbag module systems are in common use. One such system is designed for driver protection and is normally mounted within a steering wheel. Accordingly, its size and position are relatively fixed.

Passenger side airbag modules present a more difficult problem. This is due to the fact that many front seat arrangements allow for two passengers. Furthermore, the location of the passenger is not as predictable as that of the driver. Finally, in many vehicles such as trucks, the instrument panel may be close to the firewall. Since the airbag module is positioned between the instrument panel and firewall, this produces a space constraint.

Accordingly it is a primary object of the present invention to provide a passenger sloe airbag module which is relatively long but thin to permit installation in confined spaces and which allows for controlled inflation of an airbag whereby it has the maximum opportunity to protect the passenger. The manner in which these objects are achieved will be apparent from the following description and appended claims.

DISCLOSURE OF INVENTION

The invention comprises an airbag module assembly including an elongated reaction canister together with a conventional gas-producing inflator of much shorter dimensions than the canister. A diffuser within the reaction canister forms a plenum chamber which has gas outlets in preselected positions, such as at the ends of the canister. The mouth of a folded airbag is positioned to receive the gases, whereby the bag is inflated in a desired and controlled manner.

BEST MODE FOR CARRYING OUT THE INVENTION

Figure 3:
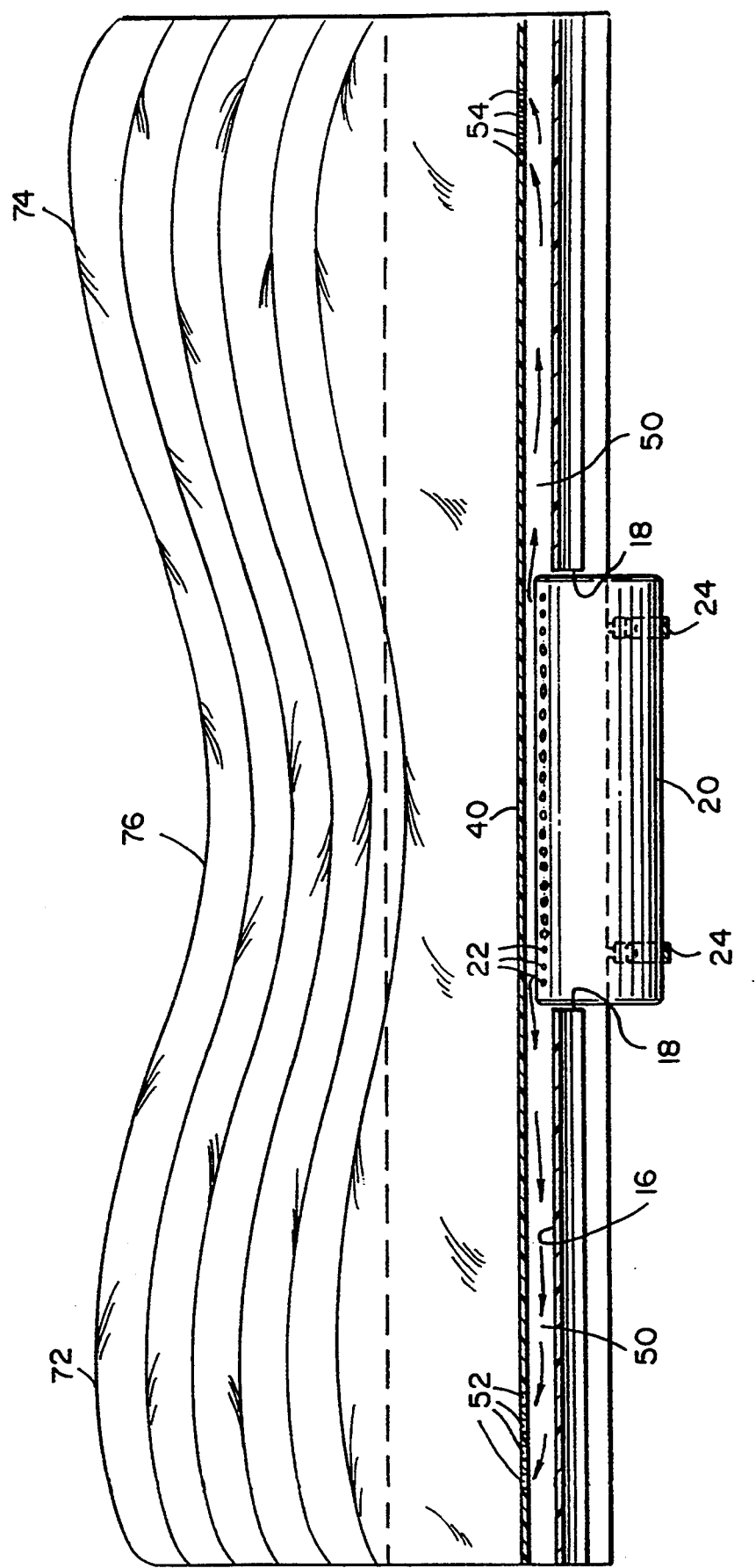
FIG. 3 is a reduced cross-section taken substantially along the line 3—3 of FIG. 2 but with the airbag in the process of inflating.

The airbag module assembly of this invention comprises a reaction canister 10. The canister 10 is extruded from a material such as aluminum. It is in the form of an open trough having first 12 and second 14 sidewalls and an inwardly curved semi-cylindrical floor 16. In the illustrated reaction canister the sidewalls are bent to an approximately 45° angle in order to conform to a specific installation. A portion of the floor 16 of the reaction canister is milled to provide a rectangular opening 18 (FIG. 3) therethrough. The opening is of sufficient size to receive the upper portion of a conventional cylindrical inflator 20 having gas venting holes 22 in its upper surface. The inflator is held in place by means of straps 24 retained by bolts 26 threaded into elongated bosses 28, 30 running the length of the reaction canister 10. The bosses 28, 30 are formed in such a manner as to provide parallel cylindrical channels 32, 34 extending along opposite sides of the floor 16 at the base of the sidewalls 12, 14. Each of the channels 32, 34 defines a slot 36 along its length.

Figure 1:
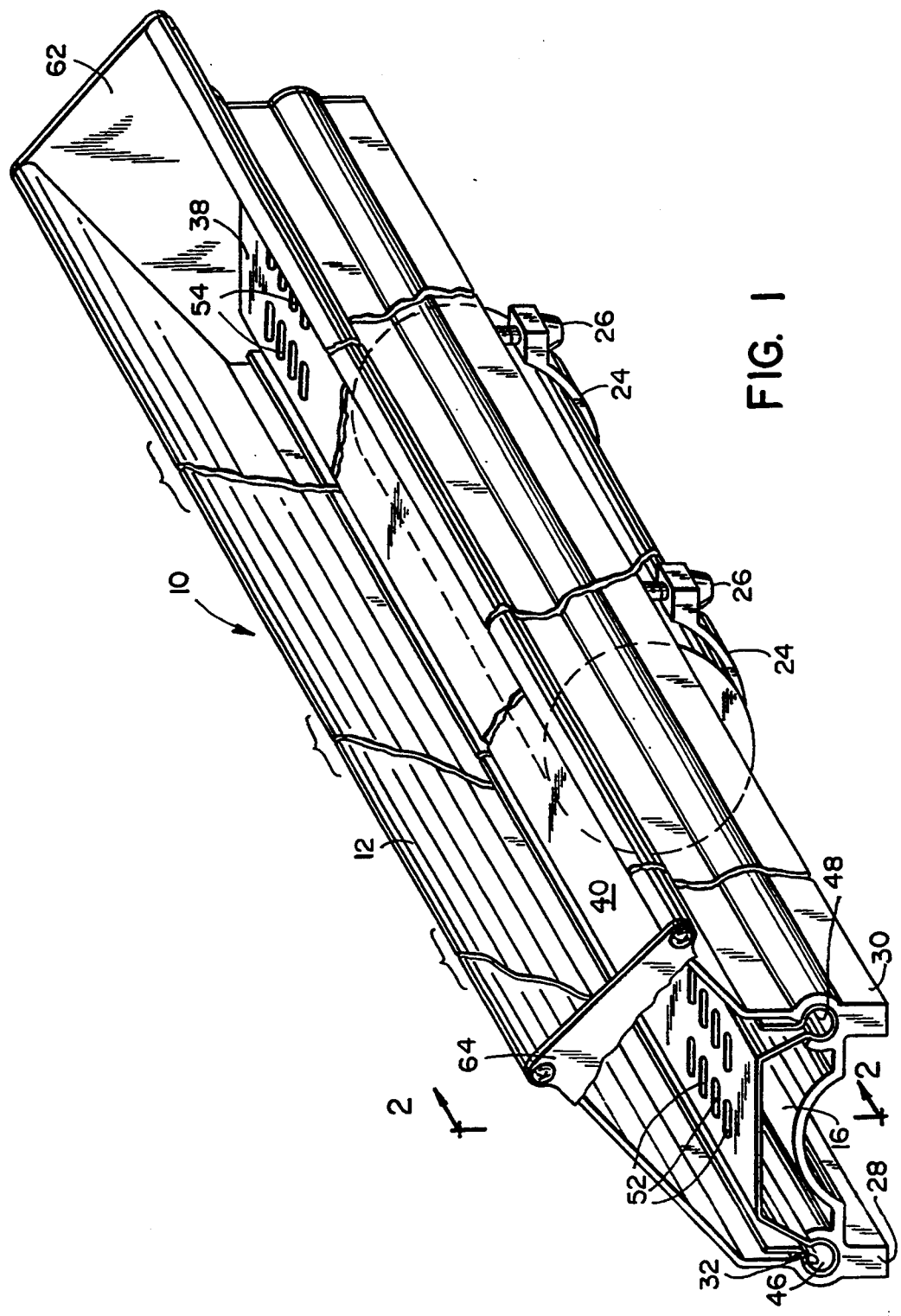
FIG. 1 is an isometric view of an airbag module assembly in accordance with this invention with one of the end plates partially broken away to reveal its construction.
Figure 2:
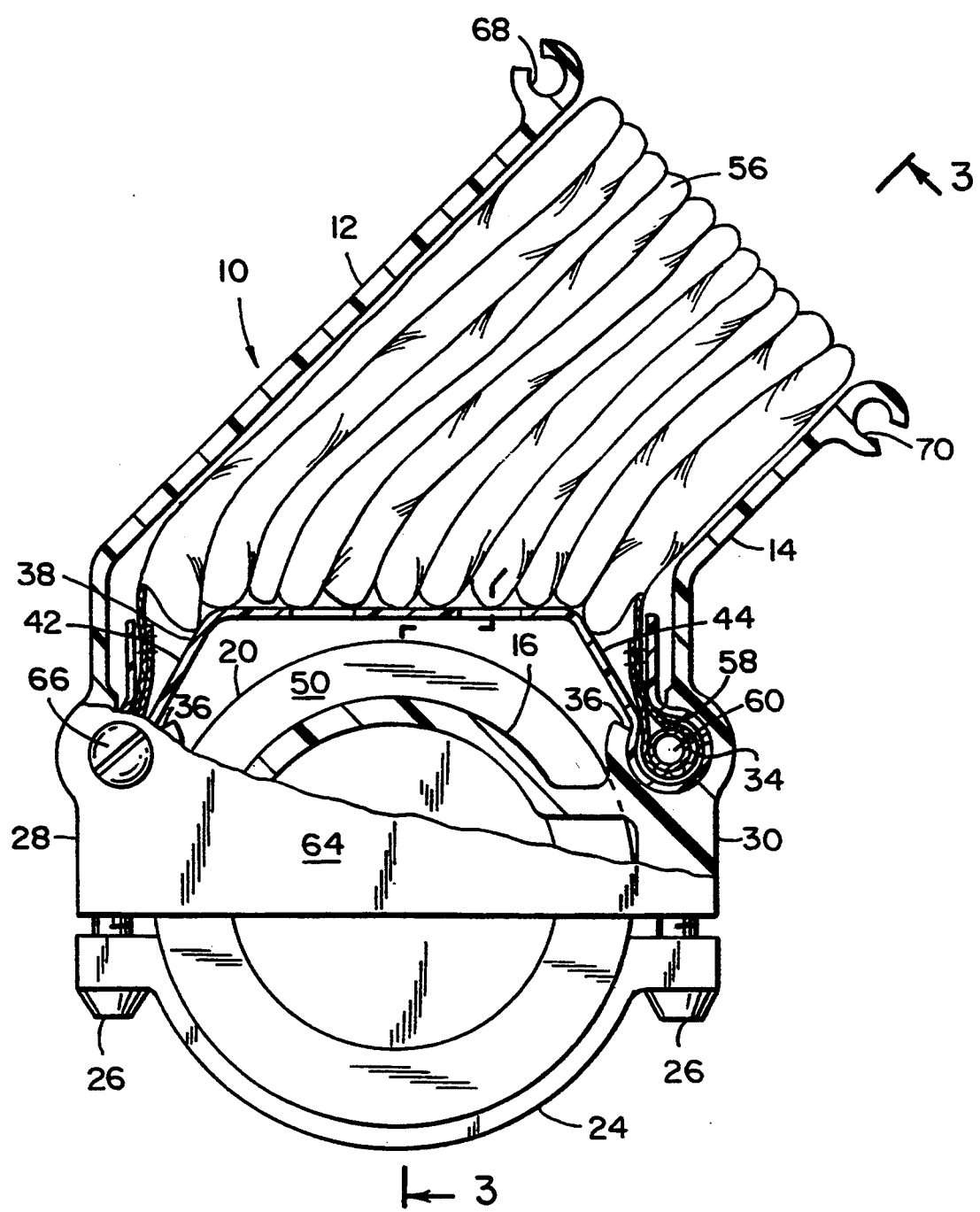
FIG. 2 is an enlarged end view taken substantially in the direction 2—2 of FIG. 1.

A sheet metal diffuser 38 is mounted within the reaction canister 10. The diffuser 38 is formed with a flat shelf 40 terminating at angled siderails 42, 44. The edges of the siderails are formed into substantially cylindrical tubes 46, 48. As will be clear from FIGS. 1 and 2, tubes 46, 48 are inserted into the channels 32, 34 thereby supporting the shelf 40 of one diffuser above the surface of the floor 16. In this manner, a plenum chamber 50 is formed which runs the length of the reaction canister 10. The shelf 40 is pierced to provide one or more gas openings or groups of gas openings 52, 54. In the illustrated embodiment, these gas openings are positioned at the extreme ends of the shelf 40.

A folded airbag 56 is housed within the reaction canister 10. The mouth of the airbag 56 is substantially rectangular and each of the two longer opposed edges is sewn into a tubular opening 58. These are inserted through the slots 36 into the respective channels 32, 34 and thereafter tubes 60 are inserted into the openings to retain them in the channels. The module is completed by the attachment of endplates 62, 64. The endplates are secured by screws 66, generally four in number. Two of these screws on each endplate are threaded directly into the ends of the respective tubes 60 which secure the mouth of the airbag. The other two screws of each endplate are threaded into channels 68, 70 formed along the edges of the sidewalls 12, 14 of the reaction canister 10.

In the event of a crash, the inflator 20 is ignited by conventional means to produce the inflating gas. It escapes through the holes 22 in the upper surface of the inflator. As illustrated by the arrows in FIG. 3, the gas passes through the plenum chamber 50 and exits through the two groups 52, 54 of gas openings in the diffuser shelf 40. As a result, two ends 72, 74 of the airbag expand more rapidly than the center 76, resulting in a "horseshoe" shape which is most helpful in enfolding a person such as a child who may be somewhat out of position in the vehicle seat.

It is believed that the many advantages of this invention will now be apparent to those skilled in the art. It will also be apparent that a number of variations and modifications may be made therein without departing from its spirit and scope. Accordingly the foregoing description is to be construed as illustrative only rather than limiting. This invention is limited only by the scope of the following claims.

We claim:

1. A passenger-side airbag module for a motor vehicle which comprises:
   a reaction canister in the form of a trough having first and second sidewalls, first and second endplates, and a floor defining a substantially rectangular opening substantially centrally located between said first and second endplates;
   a substantially cylindrical inflator mounted in said rectangular opening and having an upper surface defining gas venting holes within said trough for generating inflating gas into a limited central portion of the length of said canister;

a diffuser in said canister substantially parallel to, and spaced from, said floor to form a plenum chamber therewith for receiving and redirecting said gas;

gas discharge openings in said diffuser displaced from said limited central portion to receive and discharge the redirected gas; and a folded airbag within said canister having a mouth positioned over said diffuser and gas discharge openings.

2. The module of claim 1 wherein said gas discharge openings are positioned substantially solely at the ends of said canister, whereby said airbag is caused to expand in a horseshoe configuration prior to full inflation.

3. A passenger-side airbag module for a motor vehicle which comprises:

a reaction canister in the form of a trough having first and second sidewalls, each defining a respective first or second channel therein, a floor, and first and second endplates;

means mounted in said floor for generating inflating gas into a limited portion of the length of said canister;

a diffuser in said canister having first and second edges supported, respectively, in said first and second channels, said diffuser being substantially parallel to, and spaced from, said floor to form a plenum chamber therewith for receiving and redirecting said gas;

gas discharge openings in said diffuser displaced solely outwardly and toward said endplates from said limited portion of the length of said canister to receive and discharge the redirected gas; and a folded airbag within said canister having a mouth positioned over said diffuser and gas discharge openings.

4. The module of claim 3 wherein said first and second edges are substantially cylindrical.

5. The module of claim 4 wherein said first and second edges are tubular.

6. The module of claim 3 wherein said diffuser is a sheet including a central shelf supported above said floor by side rails terminating in said first and second edges.

7. The module of claim 6 wherein said first and second edges are substantially cylindrical.

8. The module of claim 7 wherein said first and second edges are tubular.

9. The module of claim 8 wherein said floor defines an opening therethrough and said gas generating means is mounted in said opening.

10. The module of claim 8 wherein said gas discharge openings are positioned substantially solely at the ends of said canister, whereby said airbag is caused to expand in a horseshoe configuration prior to full inflation.

* * * * *

UNITED STATES PATENT AND TRADEMARK OFFICE
CERTIFICATE OF CORRECTION

PATENT NO. : 5,435,595
DATED : 25 July 1995
INVENTOR(S) : Lauritzen et al.

It is certified that error appears in the above-indentified patent and that said Letters Patent is hereby corrected as shown below:

At column 1, line 24, "sloe" should be --side--.

Signed and Sealed this

Twenty-eighth Day of May, 1996

Attest:

BRUCE LEHMAN

Attesting Officer

Commissioner of Patents and Trademarks